G. H. FENSKE.
POST MOLD.
APPLICATION FILED JUNE 15, 1909.

970,904.

Patented Sept. 20, 1910.

Witnesses

Inventor
Gustav H. Fenske.
By Victor J. Evans
Attorney

UNITED STATES PATENT OFFICE.

GUSTAV H. FENSKE, OF CLARK, MISSOURI.

POST-MOLD.

970,904.  Specification of Letters Patent.  Patented Sept. 20, 1910.

Application filed June 15, 1909.  Serial No. 502,265.

*To all whom it may concern:*

Be it known that I, GUSTAV H. FENSKE, a citizen of the United States, residing at Clark, in the county of Randolph and State of Missouri, have invented new and useful Improvements in Post-Molds, of which the following is a specification.

This invention relates to molds for producing fence posts, and one of the principal objects of the same is to provide means for stretching the longitudinal reinforcing wires so that when the post is molded the reinforcing wires will be straight and will occupy a definite uniform position in each post.

Another object of the invention is to provide a post mold comprising hinged members which may be readily opened out to remove the molded article.

Still another object is to provide a mold comprising hinged members, means for stretching the longitudinal reinforcing wires and providing removable pins for forming the holes through the body of the post for the line wires of the fence.

These and other objects may be attained by means of the construction illustrated in the accompanying drawing, in which,—

Figure 1:
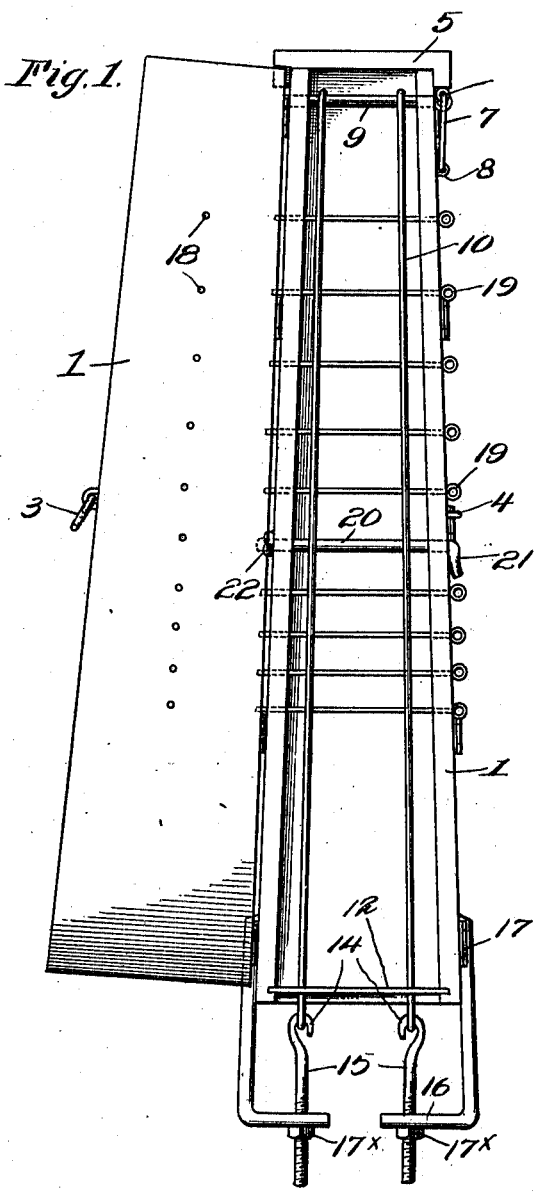
Figure 2:
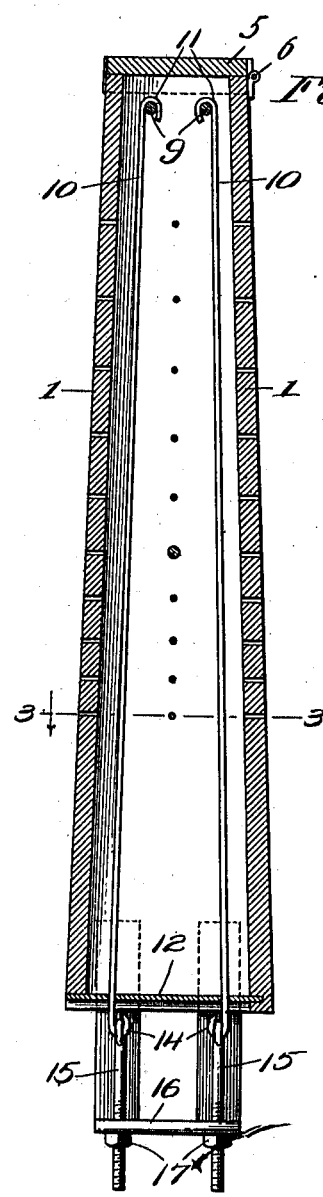
Figure 3:
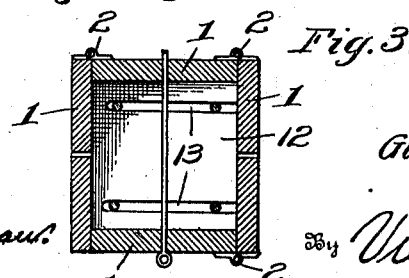

Figure 1 is a front elevation of a post mold made in accordance with my invention, one of the hinged members of the mold being thrown open. Fig. 2 is a central vertical section taken through the mold. Fig. 3 is a horizontal section taken on the line 3—3 of Fig. 2, looking in the direction indicated by the arrow.

Referring to the drawing, the numerals 1 designate the members of the mold connected together by hinges 2, one of said members being provided with a latch 3 adapted to engage a staple or other fastening 4 on one of the other members. As shown in the drawing, the members 1 are arranged to form a tapering post smaller at the top and larger at the bottom. A cap or cover 5 is hinged at 6 to the upper end, and a suitable latch 7 secured to one of the members 1 is connected by a staple 8 to the cover 5. A pair of bolts or pins 9 extend through the mold near the top, and the longitudinal reinforcing wires 10 engage said bolts or pins at the upper end by means of hooks 11 formed in the said reinforcing wires. The lower ends of the reinforcing wires 10 extend through the bottom 12 of the mold, said bottom being provided with slots 13 through which said reinforcing wires 10 pass. The lower ends of the wires 10 are provided with hooks 14, and connected to said hooks are the stretching bolts 15, said bolts passing through brackets or stirrups 16 connected in any suitable manner at 17 to the members 1. The bolts 15 are provided with threaded ends upon which the nuts 17$^x$ are fitted. Extending through holes 18 in the members 1 are pins 19 designed to form the holes in the post for the line wires. At a point nearly central in the mold is a bolt 20, one end of which is bent to form a head 21, the opposite end being threaded and provided with a nut 22 for drawing the members 1 together.

The operation of my invention may be briefly described as follows: The reinforcing wire 10 having been properly stretched in the mold and the pins 19 placed in position, the material forming the post is poured in or inserted in the mold, and after it has been partially set the cap 5 is swung open and the pins 19 removed, after which the members 1 are opened out to permit the removal of the molded article.

From the foregoing it will be obvious that the difficulty heretofore experienced in placing reinforcing rods or wires in the fence posts is obviated, owing to the fact that these wires are properly stretched and positioned uniformly in the post. Heretofore many posts have been destroyed owing to bent and misplaced reinforcing rods or wires.

I claim:—

A fence post mold comprising sides hingedly connected together, bolts loosely mounted in openings formed in opposing sides adjacent their upper ends, a bottom bridging the space between the sides at their lower ends, said bottom being formed with slots, brackets depending from and secured to the outer surfaces of the opposing sides, said brackets including lateral portions underlying the mold bottom, adjusting bolts mounted for longitudinal adjustment in lateral portions of the brackets, the respective mold sides being formed with a series of horizontally alined openings, the bolts at the uper end of the mold and the adjusting bolts below the bottom of the mold serving to receive the terminal ends of post reinforcing wires, the slots in the bottom of the mold permitting the passage of reinforcing wires through said bottom.

In testimony whereof I affix my signature in presence of two witnesses.

GUSTAV H. FENSKE.

Witnesses:
S. P. HULEN,
W. E. BROWN.